(12) United States Patent
Moore

(10) Patent No.: US 8,202,011 B2
(45) Date of Patent: Jun. 19, 2012

(54) PRINTED CIRCUIT BOARD ASSEMBLY CARRIER FOR AN OPTICAL ELECTRICAL DEVICE

(75) Inventor: Joshua Moore, Collingwood (CA)

(73) Assignee: Finisar Corporation, Sunnyvale, CA (US)

( * ) Notice: Subject to any disclaimer, the term of this patent is extended or adjusted under 35 U.S.C. 154(b) by 765 days.

(21) Appl. No.: 12/245,976

(22) Filed: Oct. 6, 2008

(65) Prior Publication Data

US 2009/0123157 A1 May 14, 2009

Related U.S. Application Data

(60) Provisional application No. 60/978,274, filed on Oct. 8, 2007.

(51) Int. Cl.
*G02B 6/36* (2006.01)
*G02B 6/42* (2006.01)
*H04B 10/00* (2006.01)

(52) U.S. Cl. ............... 385/88; 385/89; 385/92; 398/164
(58) Field of Classification Search .................... 398/164
See application file for complete search history.

(56) References Cited

U.S. PATENT DOCUMENTS

| 5,940,563 | A | * | 8/1999 | Kobayashi et al. ............. 385/92 |
|---|---|---|---|---|
| 6,287,128 | B1 | | 9/2001 | Jones et al. |
| 6,350,063 | B1 | | 2/2002 | Gilliland et al. |
| 6,464,517 | B1 | | 10/2002 | Jones |
| 6,499,890 | B2 | | 12/2002 | Gilliland et al. |
| 6,744,963 | B2 | | 6/2004 | Hwang |
| 6,811,326 | B2 | | 11/2004 | Keeble et al. |
| 6,872,010 | B1 | | 3/2005 | Bianchini |
| 6,981,805 | B2 | | 1/2006 | Miller et al. |
| 7,371,095 | B2 | * | 5/2008 | Takahashi ..................... 439/261 |
| 2001/0017965 | A1 | * | 8/2001 | Bruland et al. ................. 385/92 |
| 2003/0216064 | A1 | * | 11/2003 | Yoshikawa .................... 439/76.1 |
| 2006/0205258 | A1 | * | 9/2006 | Cho et al. ...................... 439/326 |
| 2008/0203864 | A1 | * | 8/2008 | Moore et al. ............... 312/223.1 |
| 2009/0015456 | A1 | * | 1/2009 | Moore .............................. 342/4 |
| 2009/0032291 | A1 | * | 2/2009 | Moore et al. .................. 174/255 |

(Continued)

FOREIGN PATENT DOCUMENTS

JP 2006113455 11/2004

(Continued)

OTHER PUBLICATIONS

United States Patent & Trademark Office, Examiner's Office Action mailed Apr. 15, 2010, U.S. Appl. No. 12/246,092.

(Continued)

*Primary Examiner* — Michelle R Connelly Cushwa
(74) *Attorney, Agent, or Firm* — Maschoff Gilmore & Israelsen

(57) ABSTRACT

A printed circuit board assembly (PCBA) carrier for enclosing an optical transceiver PCBA. The PCBA carrier includes a base portion including one or more first connection members, the base portion being configured to receive an optical transceiver PCBA and a top portion including one or more second connection members configured to couple to the first connection members to thereby secure the top portion to the base portion, the top portion being configured to reside above the optical transceiver PCBA when the first and second connection members are coupled. The PCBA carrier is further configured to enclose the optical transceiver PCBA when the base and top portions are coupled to provide a solid structure for the optical transceiver PCBA without the need for a separate optical transceiver module housing.

20 Claims, 11 Drawing Sheets

U.S. PATENT DOCUMENTS

2009/0092399 A1    4/2009   Moore et al.

FOREIGN PATENT DOCUMENTS

JP            2005-316475         11/2005

OTHER PUBLICATIONS

Amendment and Response to Office Action, submitted May 6, 2010, U.S. Appl. No. 12/246,092.
United States Patent & Trademark Office, Notice of Allowance mailed Jun. 4, 2010, U.S. Appl. No. 12/246,092.
International Searching Authority, Written Opinion of the International Searching Authority, PCT/US2008/079222, mailed Apr. 30, 2009.
International Searching Authority, Written Opinion of the International Searching Authority, PCT/US2008/078918, mailed Apr. 3, 2009.
International Search Report, International Application No. PCT/US2008/079222, Mailing Date Apr. 30, 2009.
International Search Report, International Application No. PCT/US2008/078918, Mailing Date Apr. 3, 2009.
United States Patent & Trademark Office, Examiner's Office Action mailed Aug. 7, 2009, U.S. Appl. No. 12/246,092.
Applicants' Amendment and Response to Office Action, submitted via e-file Oct. 28, 2009, U.S. Appl. No. 12/246,092.
United States Patent & Trademark Office, Examiner's Final Office Action mailed Dec. 10, 2009, U.S. Appl. No. 12/246,092.
Applicants' RCE and Submission in response to Final Office Action, submitted via e-file Mar. 8, 2010, U.S. Appl. No. 12/246,092.

* cited by examiner

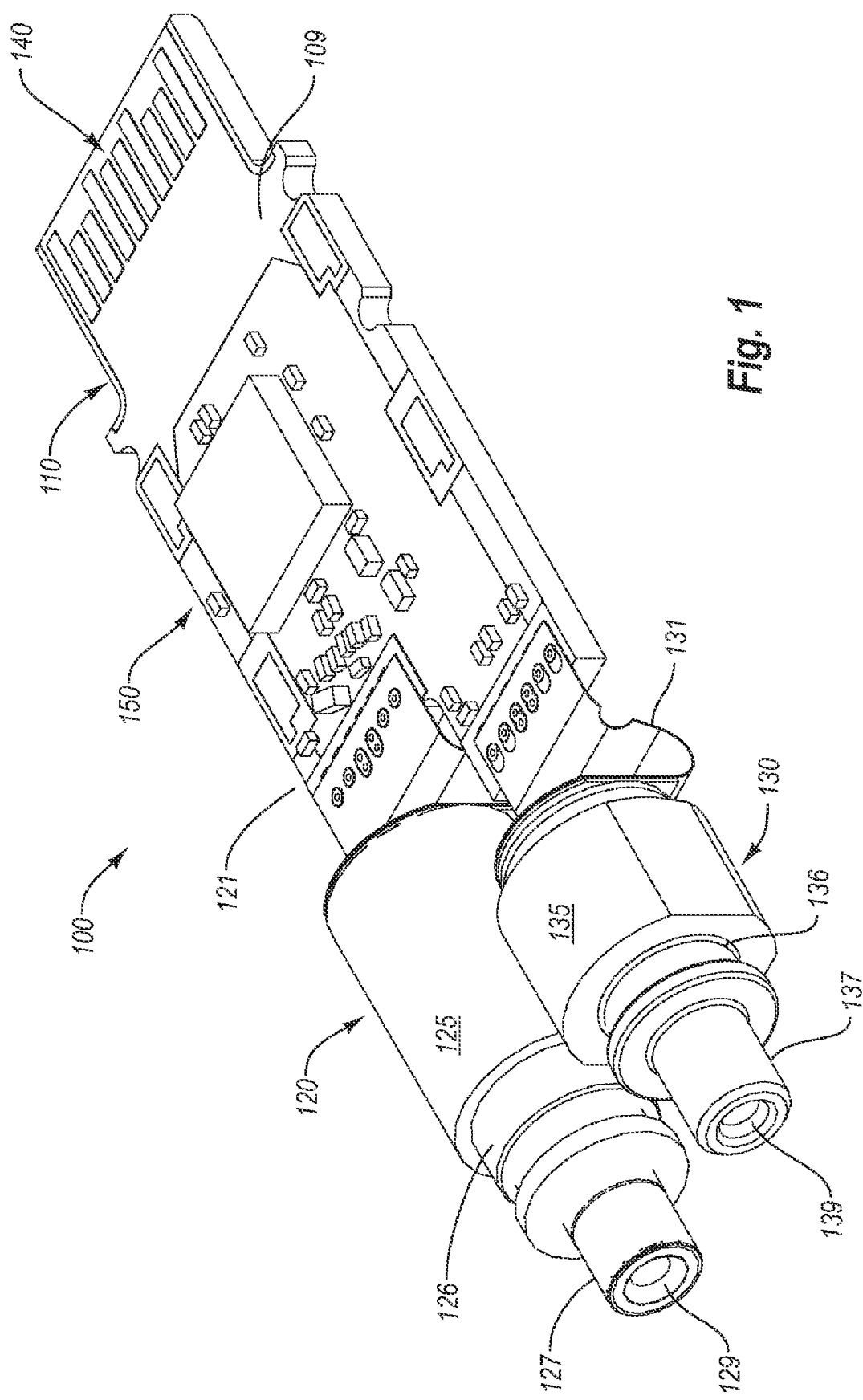

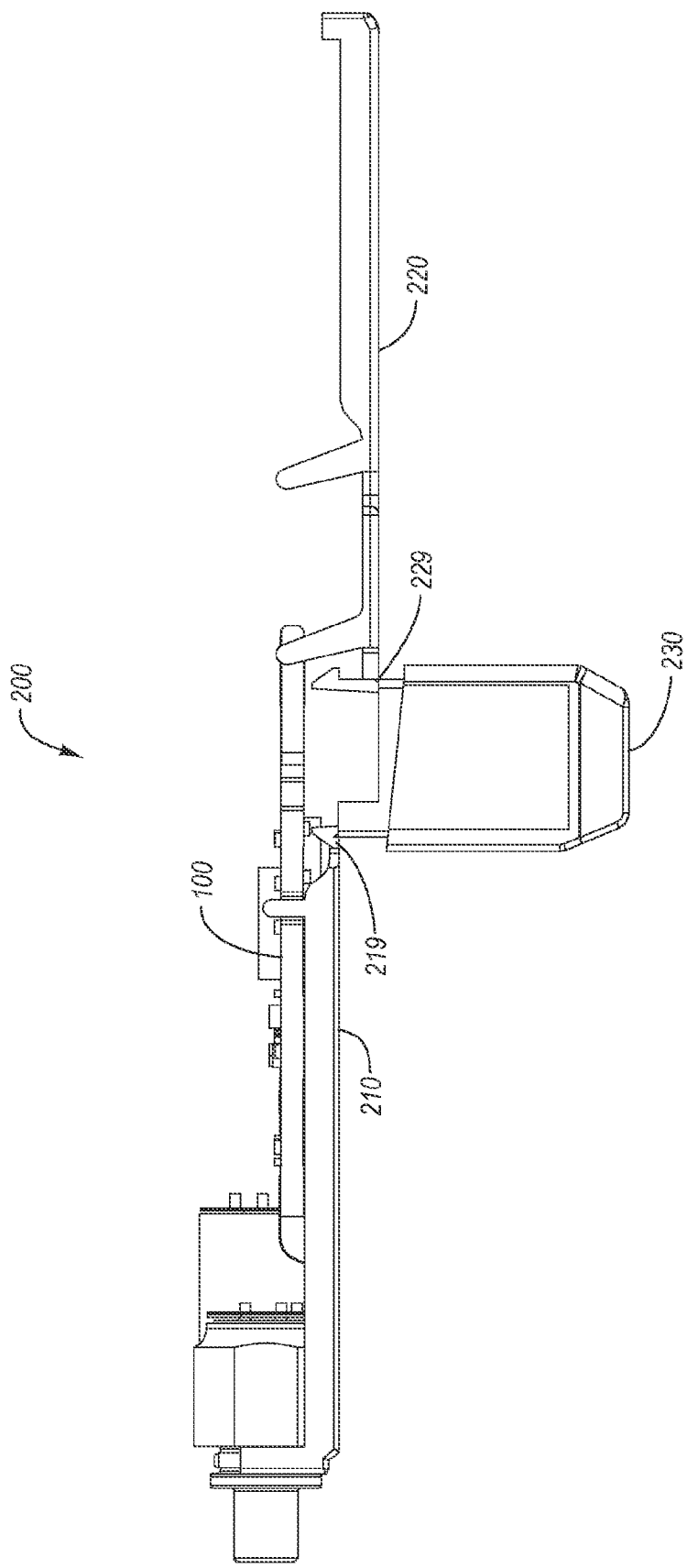

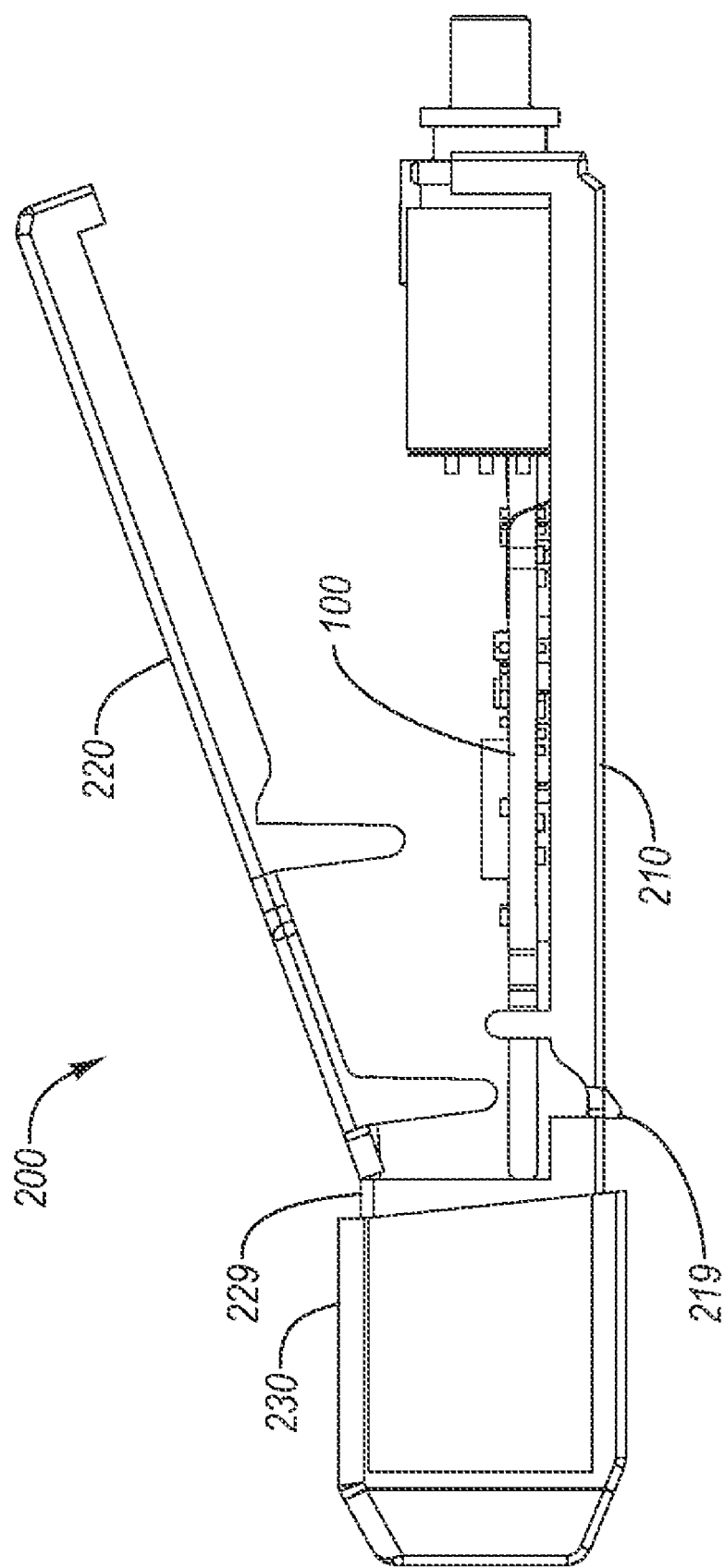

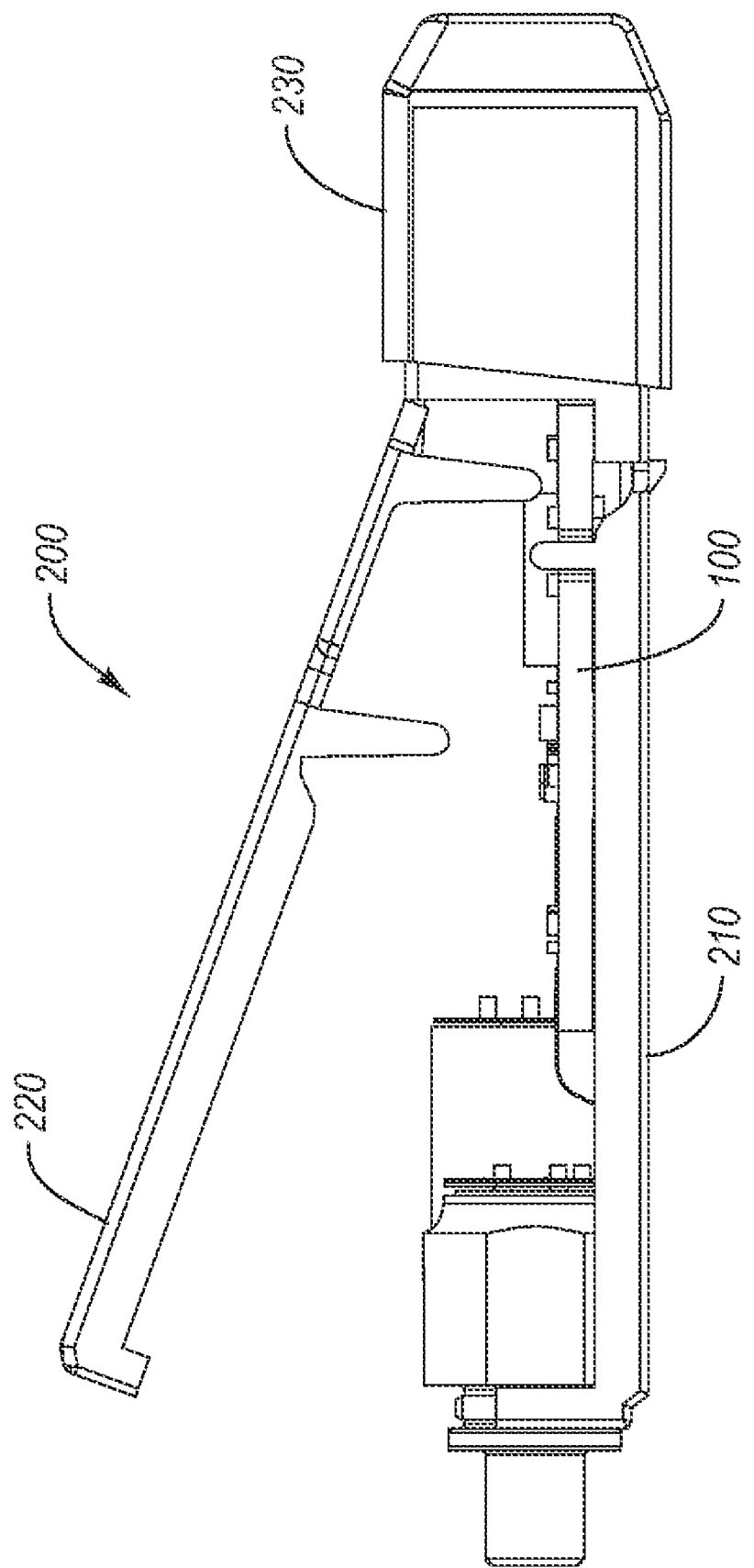

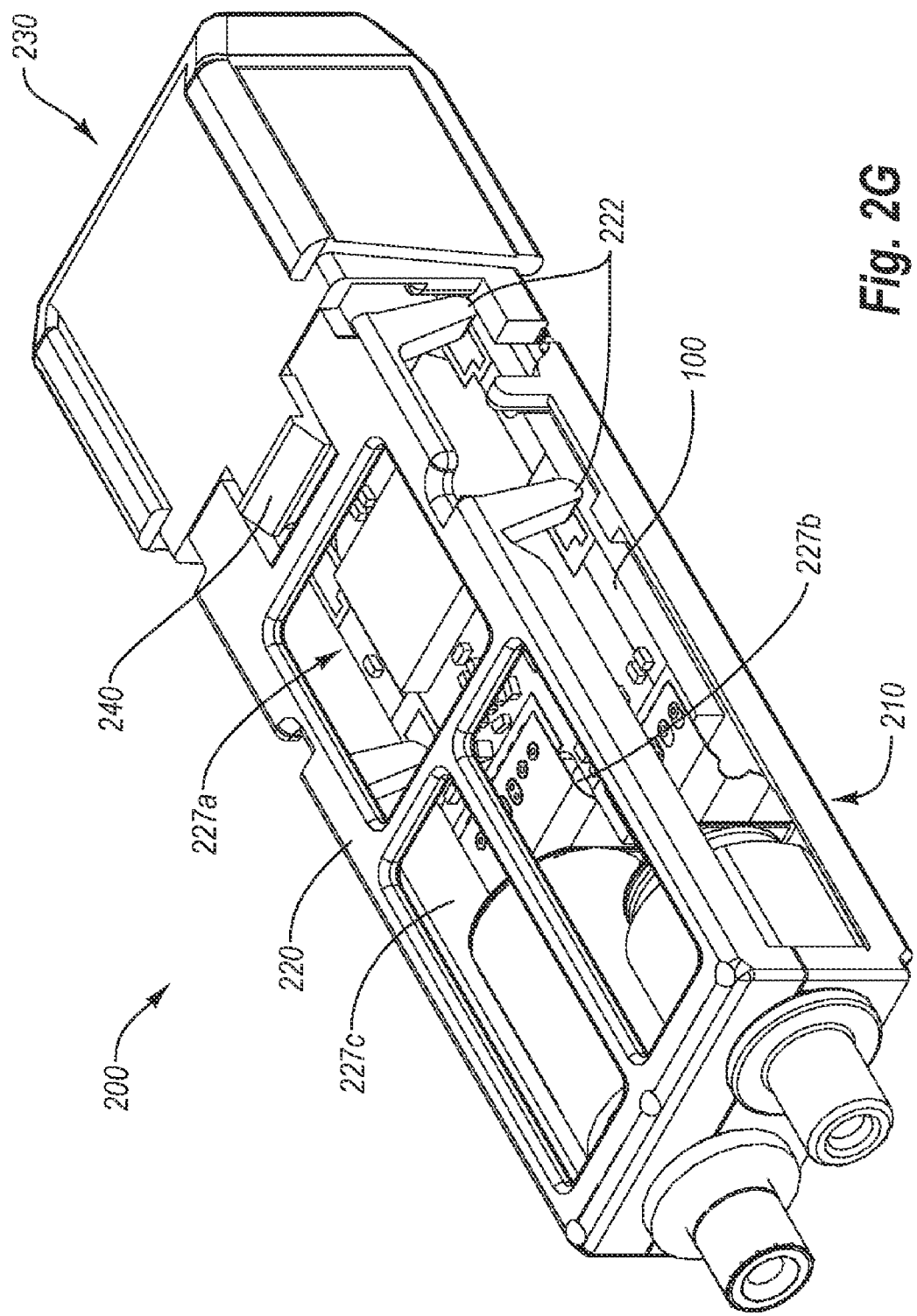

PRINTED CIRCUIT BOARD ASSEMBLY CARRIER FOR AN OPTICAL ELECTRICAL DEVICE

CROSS-REFERENCE TO RELATED APPLICATIONS

This application claims the benefit of U.S. Provisional Application No. 60/978,274, filed Oct. 8, 2007, which is incorporated herein by reference in its entirety.

BACKGROUND

Electronic modules, such as electronic or optoelectronic transceiver or transponder modules, are increasingly used in electronic and optoelectronic communication. Some electronic modules can be plugged into a variety of host networking equipment. Multi-Source Agreements ("MSAs"), such as the X2 MSA, XENPAK MSA, SFF MSA, the SFP MSA, and the SFP+ (IPF) MSA specify, among other things, package dimensions for electronic modules. Conformity with an MSA allows an electronic module to be plugged into host equipment designed in compliance with the MSA. Electronic modules typically communicate with a printed circuit board of a host device by transmitting electrical signals to the printed circuit board and receiving electrical signals from the printed circuit board. These electrical signals can then be transmitted by the electronic module outside the host device as optical and/or electrical signals.

Typically, an electronic module includes various electrical circuitry implemented on a printed circuit board. The printed circuit board is then placed in a metallic shell. While the metallic shell provides a solid structure for the module printed circuit board, it may make testing of the circuitry difficult as the shell must be removed to access desired test access

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment disclosed herein relates to a printed circuit board assembly (PCBA) carrier for enclosing an optical transceiver PCBA. The PCBA carrier includes a base portion including one or more first connection members, the base portion being configured to receive an optical transceiver PCBA and a top portion including one or more second connection members configured to couple to the first connection members to thereby secure the top portion to the base portion, the top portion being configured to reside above the optical transceiver PCBA when the first and second connection members are coupled. The PCBA carrier is configured to enclose the optical transceiver PCBA when the base and top portions are coupled to provide a solid structure for the optical transceiver PCBA without the need for a separate optical transceiver module housing. The base portion and the top portion further cooperate when coupled to define a pair of openings configured to allow a pair of optical sub-assemblies of the optical transceiver PCBA to extend outside the carrier. The pair of openings are configured such that at least a portion of a flange region of each of the pair of optical sub-assemblies is positioned in the corresponding opening when the pair of optical sub-assemblies of the optical transceiver PCBA extend outside the carrier.

Another embodiment disclosed herein relates to a printed circuit board assembly (PCBA) carrier for enclosing an optical transceiver PCBA. The PCBA carrier includes a base portion including one or more first connection members, the base portion being configured to receive an optical transceiver PCBA, a top portion including one or more second connection members configured to couple to the first connection members to thereby secure the top portion to the base portion, the top portion being configured to reside above the optical transceiver PCBA when the first and second connection members are coupled, and an end portion coupled to the base portion by a first hinge portion and coupled to the top portion by a second hinge portion such that the end portion may rotate in relation to the base portion and the top portion may rotate in relation to the end portion, the end portion being configured to receive a portion of the optical transceiver PCBA. The PCBA carrier is further configured to enclose the optical transceiver PCBA when the base and top portions are coupled to provide a solid structure for the optical transceiver PCBA without the need for a separate optical transceiver module housing.

A further embodiment disclosed herein relates to an optoelectronic transceiver module that comprises a module shell defining a cavity and a printed circuit board assembly (PCBA) carrier configured to be placed in the cavity of the module shell. The PCBA carrier includes a base portion including one or more first connection members, the base portion being configured to receive an optical transceiver PCBA, a top portion including one or more second connection members configured to couple to the first connection members to thereby secure the top portion to the base portion, the top portion being configured to reside above the optical transceiver PCBA when the first and second connection members are coupled, and an end portion coupled to the base portion by a first hinge portion and coupled to the top portion by a second hinge portion such that the end portion may rotate in relation to the base portion and the top portion may rotate in relation to the end portion, the end portion being configured to receive a portion of the optical transceiver PCBA. The PCBA carrier is further configured to enclose the optical transceiver PCBA when the base and top portions are coupled to provide a solid structure for the optical transceiver PCBA without the need for a separate optical transceiver module housing.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1 illustrates an example optoelectronic transceiver;

FIGS. 2A-2G illustrate an example PCBA carrier in various stages of assembly in accordance with an embodiment of the present invention.

DETAILED DESCRIPTION

Figure 2A:
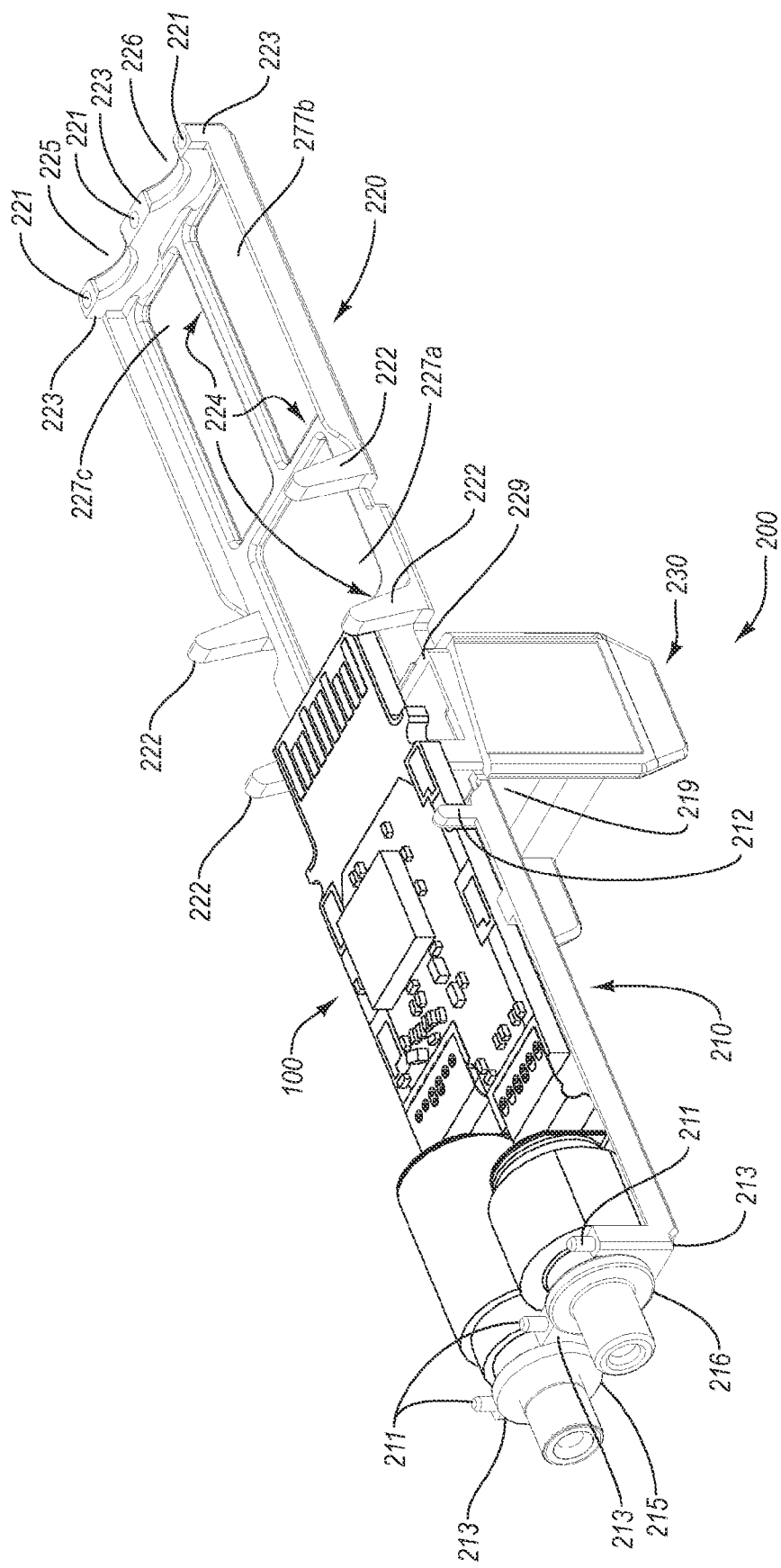

Example embodiments of the present invention relate to various mechanical systems that can be implemented in an electronic module, such as an electronic or optoelectronic transceiver or transponder module. Some electronic modules can be configured to be plugged into a variety of host equipment.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

Example Optoelectronic Transceiver

Reference is first FIG. 1, which illustrates an embodiment of an optoelectronic transceiver 100 for use in transmitting and receiving optical signals in connection with a host device (not shown). The optoelectronic transceiver 100 can be configured for optical signal transmission and reception at a variety of per-second data rates including, but not limited to, 1 Gbit, 2 Gbit, 2.5 Gbit, 4 Gbit, 8 Gbit, 10 Gbit, or higher. Furthermore, the optoelectronic transceiver 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic transceiver module 100 can be configured to support various transmission standards including, but not limited to, Fast Ethernet, Gigabit Ethernet, 10 Gigabit Ethernet, and 1x, 2x, 4x, and 10x Fiber Channel.

As shown in FIG. 1, optoelectronic transceiver 100 includes a printed circuit board assembly ("PCBA") 110 that includes a printed circuit board ("PCB") 109 with various optical transceiver electronics mounted thereon. PCBA 110 and its various electronics are configured to be placed inside an optoelectronic transceiver carrier as will be explained in more detail to follow.

As also disclosed in FIG. 1, the PCBA 110 includes a transmitter optical subassembly ("TOSA") 120, a receiver optical subassembly ("ROSA") 130, electrical interfaces 121 and 131, and an edge connector 140. The two electrical interfaces 121 and 131 are used to electrically connect the TOSA 120 and the ROSA 130, respectively, to the PCBA 110.

The TOSA 120 of the optoelectronic transceiver 100 includes a barrel 125 within which an optical transmitter, such as a laser, (not shown) is disposed. The optical transmitter is configured to convert electrical signals received through the PCBA 110 from a host device (not shown) into corresponding optical signals. The TOSA 120 also includes a flange region 126 and a nose piece 127. The nose piece 127 defines a port 129. The port 129 is configured to optically connect the optical transmitter disposed within the barrel 125 with a fiber-ferrule (not shown).

Similarly, the ROSA 130 of the optoelectronic transceiver 100 includes a barrel 135, a flange region 136, and a nose piece 137. The nose piece 137 defines a port 139. The port 139 is configured to optically connect an optical receiver, such as a photodiode (not shown), disposed within the barrel 135 to a fiber-ferrule (not shown). The optical receiver is configured to convert optical signals received from the fiber-ferrule into corresponding electrical signals for transmission to a host device (not shown) through the PCBA 110.

As further disclosed in FIG. 1, the PCBA 110 includes optical transceiver electronics 150. Such electronics may include, but are not limited to, a controller, a laser driver, and a post-amplifier, each of which is configured to help allow optoelectronic transceiver 100 to convert optical signals into electrical signals and to convert electric signals into optical signals.

Example PCBA Carrier

In many cases, optoelectronic transceiver 100 is placed in a metallic module shell prior to being used. The module shell provides a solid structure that protects optoelectronic transceiver 100 when in use. However, typical module shells may be expensive to build and may require many pieces. In applications such as testing optoelectronic transceiver 100, however, taking the time to enclose optoelectronic transceiver 100 in the metallic module shell may be time consuming. Enclosing the optoelectronic transceiver 100 in the metallic module shell also limits a user's ability to access the PCBA 110 and optical sub assemblies 120 and 130 during module operation.

Accordingly, the principles of the present invention relate to a PCBA carrier that may be used in applications such as testing in place of the metallic module shell. In addition, in some embodiments, the PCBA carrier of the present invention may be used in conjunction with a metallic module shell to improve performance of the optoelectronic transceiver 100 by reducing EMI.

Reference is now made to FIGS. 2A-2G, which disclose an embodiment of a PCBA carrier 200 in accordance with the principles of the present invention. PCBA carrier 200 is configured to provide a solid structure for optical transceiver 100 without the need for a metallic module shell. PCBA carrier 200 allows optoelectronic transceiver 100 to be fully testable once assembled in PCBA carrier 200. Advantageously, performing a test of optoelectronic transceiver 100 without the metallic module shell eliminates scrap and reduces rework cost and also allows easy access to various test points that can be easily probed while optoelectronic transceiver 100 is operational.

Turning first to FIG. 2A, an isometric view of an embodiment of the PCBA carrier 200 is illustrated. As shown, PCBA carrier 200 is configured to house optoelectronic transceiver 100. Note that in this figure and the figures to follow, one or more components of optoelectronic transceiver 100, such as circuitry 150, may not be illustrated so as to focus on the PCBA carrier 200. PCBA carrier 200 may be made of injection molded plastic, although one of skill will also appreciate that other materials and manufacturing methods may also be implemented as circumstances warrant.

PCBA 200 includes a first or base portion 210. Base portion 210 is configured such that optoelectronic transceiver 100 may be placed on top of it such that optoelectronic transceiver 100 sits in base portion 210. Accordingly, base portion 210 includes a U shaped opening 215 that is configured to hold TOSA 120 and a U shaped opening 216 that is configured to hold ROSA 130. In the present embodiment, flange region 126 rests on the base portion of opening 215 and flange region 136 rests on the base portion of opening 216.

The openings 215 and 216 are defined by extending portions 213 that extend upward from the main body of base portion 210 towards top portion 220 when the top portion 220 couples with the base portion 210. In addition, extending portions 213 may include knob portions 211 that are configured to interact with top portion 220 as will be explained in further detail to follow.

Base portion 210 further includes one or more posts 212 that extend upward from the main body base portion 210 towards top portion 220 when the top portion 220 couples with the base portion 210. Posts 212 are configured to help secure and align optoelectronic transceiver 100 and to interact with top portion 220 when PCBA carrier 200 is fully assembled.

As mentioned, PCBA carrier 200 also includes a second or top portion 220. Top portion 200 is configured to couple with base portion 210 so as to enclose optoelectronic transceiver 100. Accordingly, top portion 220 includes openings 225 and 226 that mate with openings 215 and 216 to form full openings for TOSA 120 and ROSA 130. The openings 225 and 226 are formed by extending portions 223 that extend from the main body of top portion 220 towards the base portion 210 when the top portion 220 couples with the base portion 210. In addition, extending portions 223 may include holes 221 that are configured to mate with knob portions 211 to help secure top portion 220 to base portion 210.

Thus, as is illustrated more clearly in FIG. 2G, when the base portion 210 and the top portion 220 are coupled, the openings 215 and 225 and the openings 216 and 226 mate to form round openings for the TOSA 120 and the ROSA 130 respectively. These openings allow the ports 129 and 139 to extend out of the PCBA carrier 200.

Top portion 220 may further include one or more posts 222 that are configured to help secure and align optoelectronic transceiver 100 and to interact with base portion 210 when PCBA carrier 200 is fully assembled. Posts 222 are compliant and compress against the PCBA 110 when the PCBA carrier 200 is fully assembled. This compression biases the PCBA 110 downwards towards the base portion 210 when the top portion 220 couples with the base portion 210, and thus holds the PCBA 110 in position on base portion 210. The compliant posts 222 eliminate the need for fasteners, screws, or other like devices to hold the PCBA 110 in position on base portion 210 and can accommodate the large tolerance variation of PCBA thicknesses.

Top portion 220 may also include body portions 224 that help to secure and protect optoelectronic transceiver 100. In addition, the body portions 224 may define various openings 227a, 227b, and 227c (also referred to as openings 227) in the top portion 220. In some embodiments, the openings 227 are configured to receive a snap-in heat sink or other thermal control material (not shown). The snap-in heat sink provides heat sinking for the electrical circuitry 150 of optoelectronic transceiver 100. As shown in FIG. 3G, opening 227a is above the circuitry 150. Accordingly, the snap-in heat sink is able to provide heat sinking when necessary for the circuitry and to be removed if needed. In further embodiments, the openings 227 may be configured to receive snap-in EMI absorbing materials and the like. It will be appreciated that although FIGS. 2A-2G show three openings 227, more or less than this number may be implemented in PCBA carrier 200 as circumstances warrant.

PCBA carrier 200 further includes a third or end portion 230. As illustrated, end portion 230 is coupled to both base portion 210 and top portion 220 at an end that is opposite of openings 215, 216 and openings 225, 226 when the top portion 220 couples with the base portion 210 (see FIG. 2G). When PCBA carrier 200 is fully assembled, end portion 230 acts as a partial covering of end connector 140, while still allowing end connector 140 to be inserted into a host connector or like system.

Figure 2B:
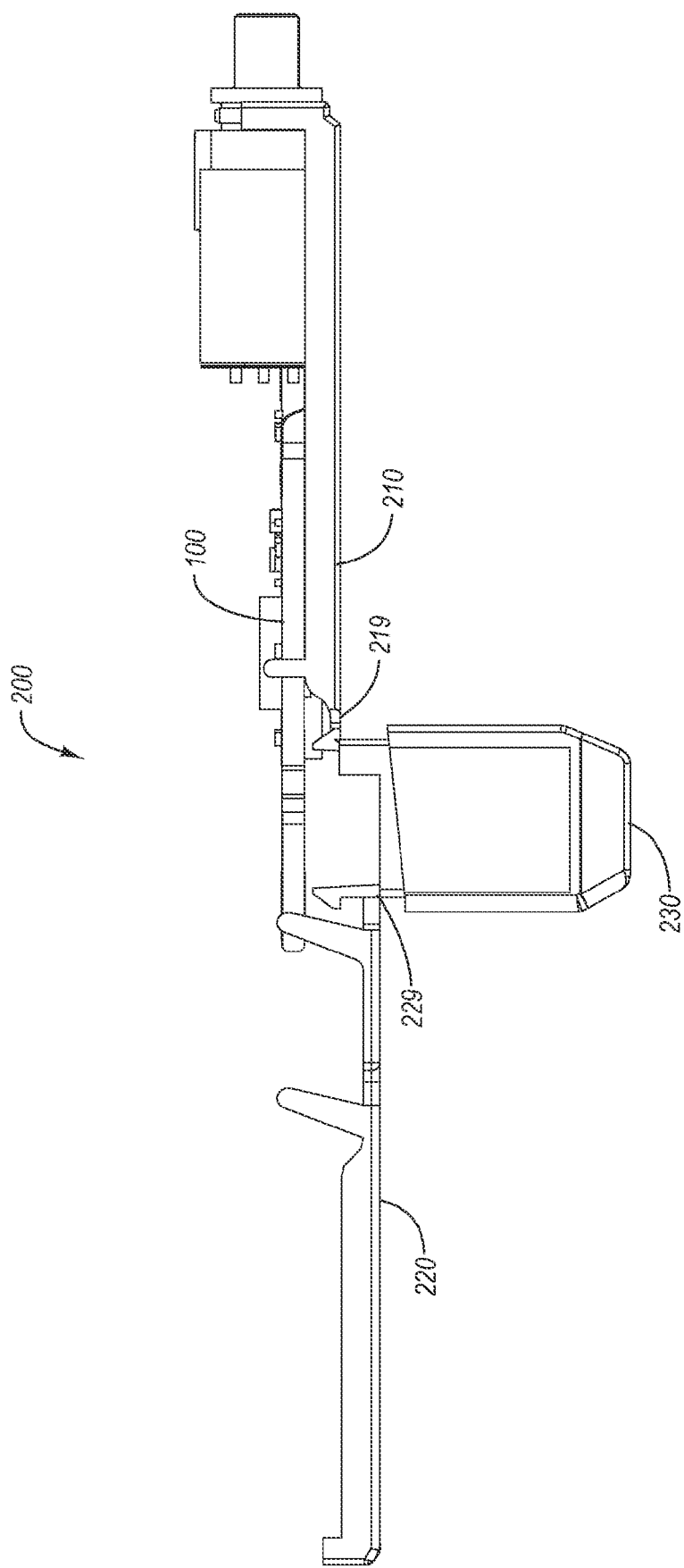

In the present embodiment, end portion 230 is coupled to base portion 210 by one or more hinge portions 219 and is coupled to top portion 220 by one or more hinge portions 229. The hinge portions 219 and 229 allow PCBA carrier 200 to be implemented as a single piece. The hinge portions also allows top portion 220 and end portion 230 to rotate into a final position relative to base portion 210. Of course, it will be appreciated that the three portions of PCBA carrier 200 may be implemented as unconnected pieces that are then coupled together through any reasonable means. FIGS. 2B and 2C show side views of PCBA carrier 200 in the unassembled state of FIG. 2A.

Figure 2D:
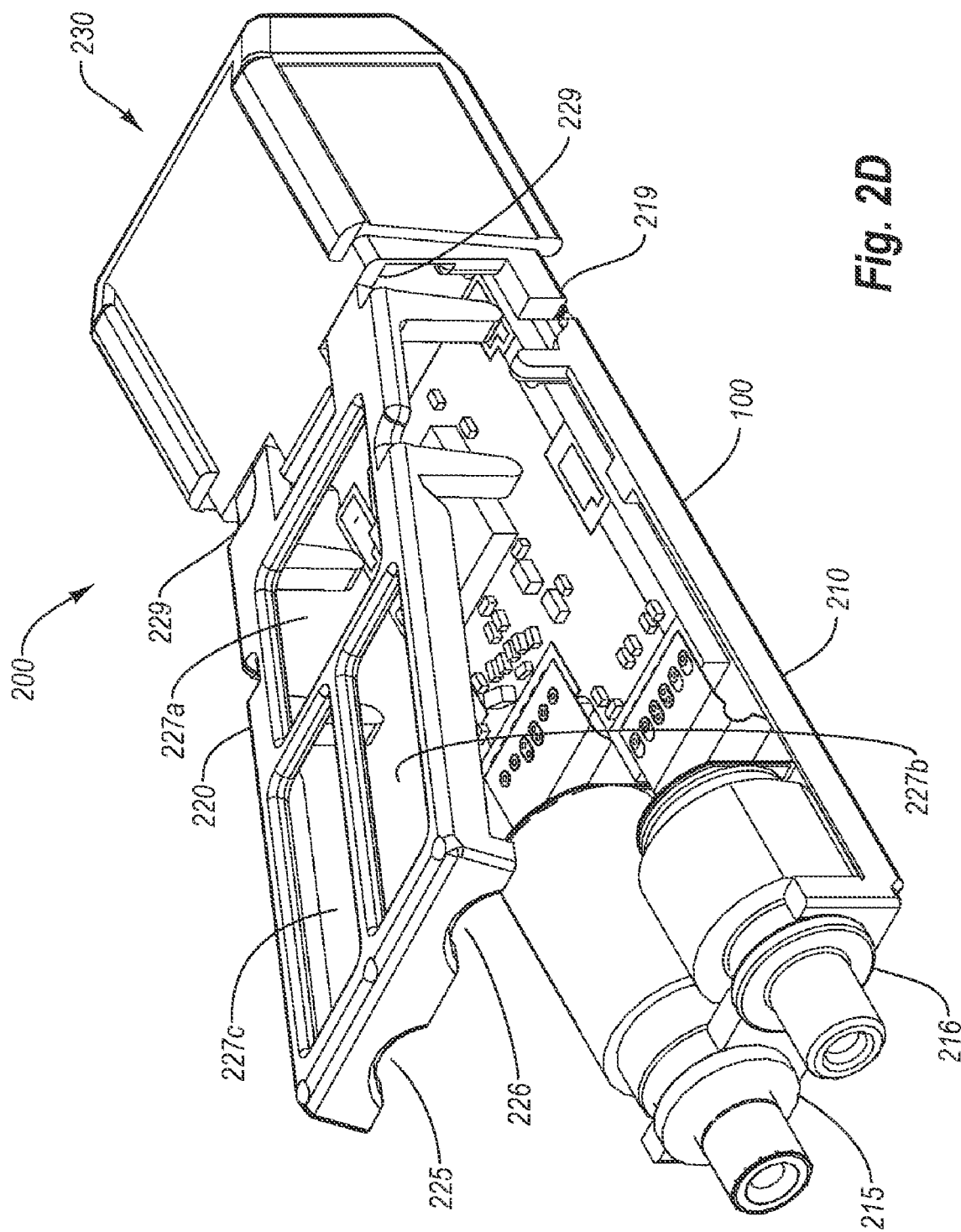

FIGS. 2D-2F illustrate various views of PCBA carrier 200 in a partially assembled state. As shown, end portion 230 has rotated along hinge portions 219 to cover end connector 140. This rotation has in turn caused top portion 220 to rotate to a position above optoelectronic transceiver 100. In the illustrated views, top portion 220, however, has not yet engaged with base portion 210.

FIG. 2G illustrates PCBA carrier 200 in a fully assembled state. As shown, top portion 220 has rotated on hinge portions 229 to fully engage base portion 210. Accordingly, PCBA carrier 200 provides a solid structure for optical transceiver 100 without the need for a metallic module shell.

PCBA carrier 200 provides several novel advantages. For example, PCBA carrier 200 eliminates the need for additional piece parts to secure optical transceiver 100 such as solder mount technology springs, compression pads, screws, fasteners, epoxies, adhesives, or other hold down components typically used to secure PCBA 110 to a module housing. As mentioned, post 222 provide force to PCBA 110 that secures PCBA 110 to the base portion 210.

PCBA carrier 200 also allows for quick assembly and re-workability while maximizing the optical transceiver 100 component space. PCBA carrier 200 also is a screw-less snap fit design that does not require fasteners or adhesives. Further, PCBA carrier 200 may be implemented to accept various shapes and sizes of optical sub assembly packaging. Also, using hinge portions 219 and 229 to make PCBA carrier one piece eliminates or reduces the need for additional parts and reduces the mechanical space needed for mating features.

In addition, PCBA carrier 200 is configured to provide a solid structure for optical transceiver 100 without the need for a metallic module shell. PCBA carrier 200 allows optoelectronic transceiver 100 to be fully testable once assembled in PCBA carrier 200 and allows easy access to desirable test points.

Example Embodiment Used with a Module Shell

Figure 3A:
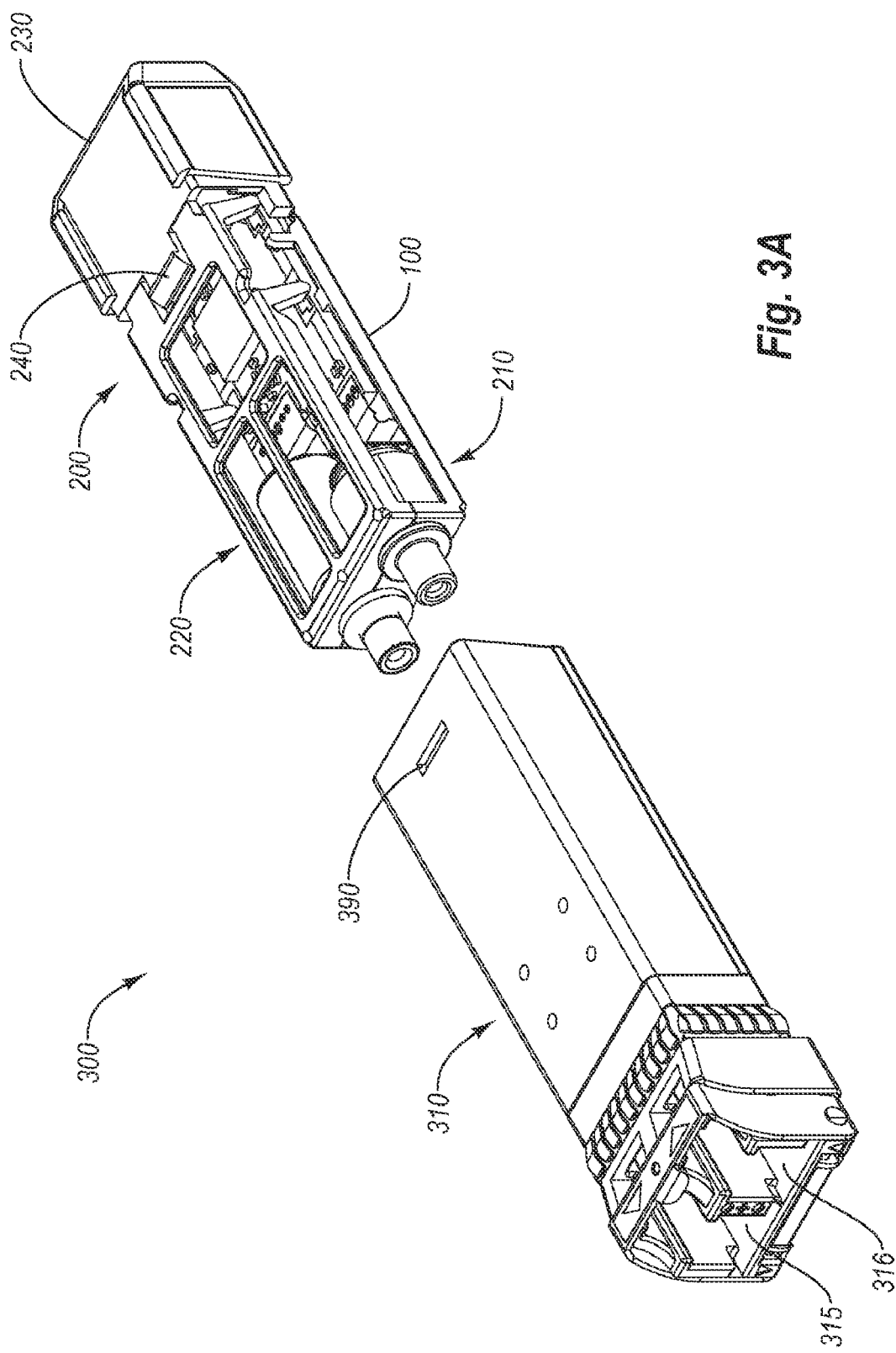
FIGS. 3A-3C illustrate an embodiment of the present invention that implements an optical transceiver module shell and a PCBA carrier.
Figure 3B:
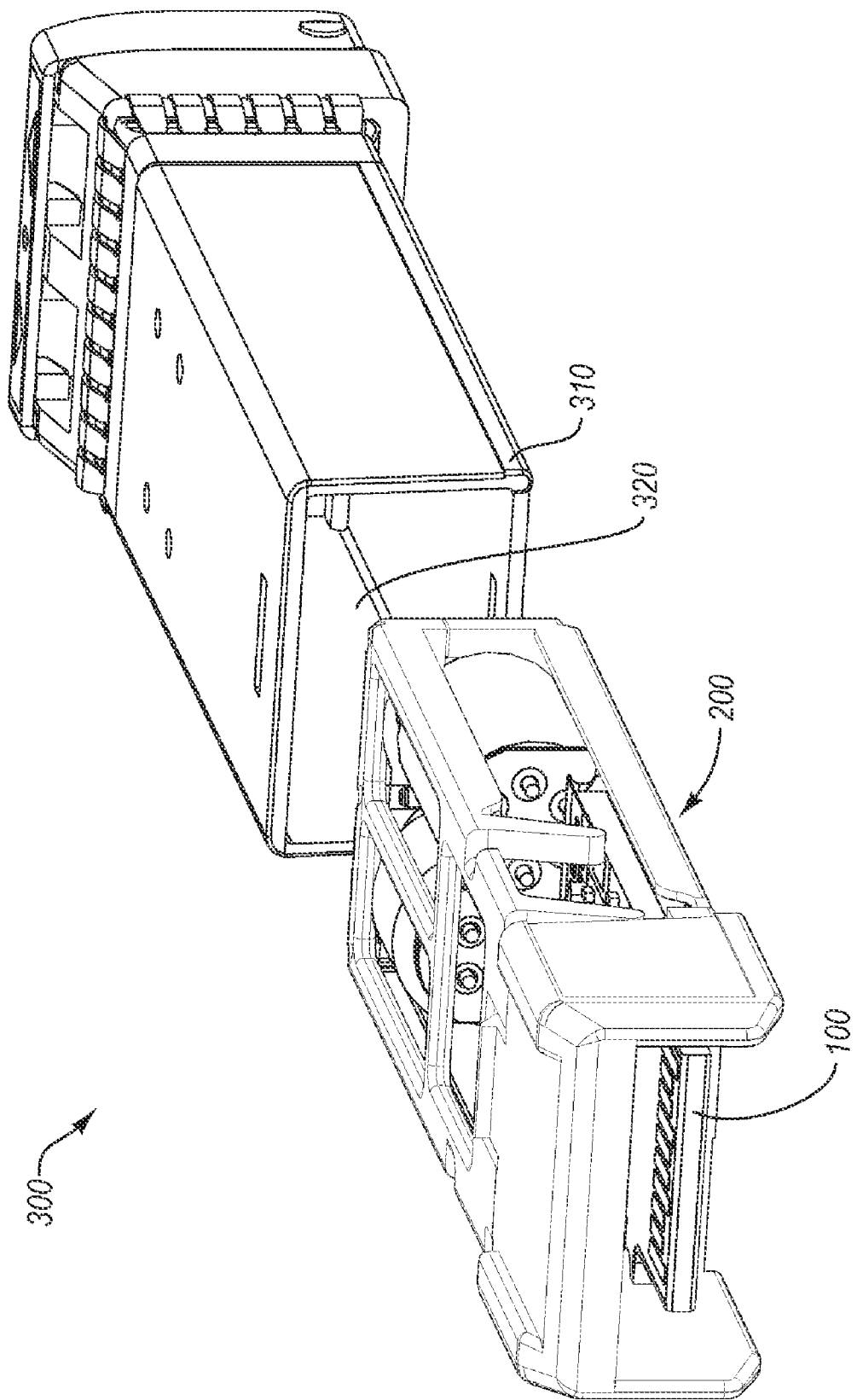
Figure 3C:
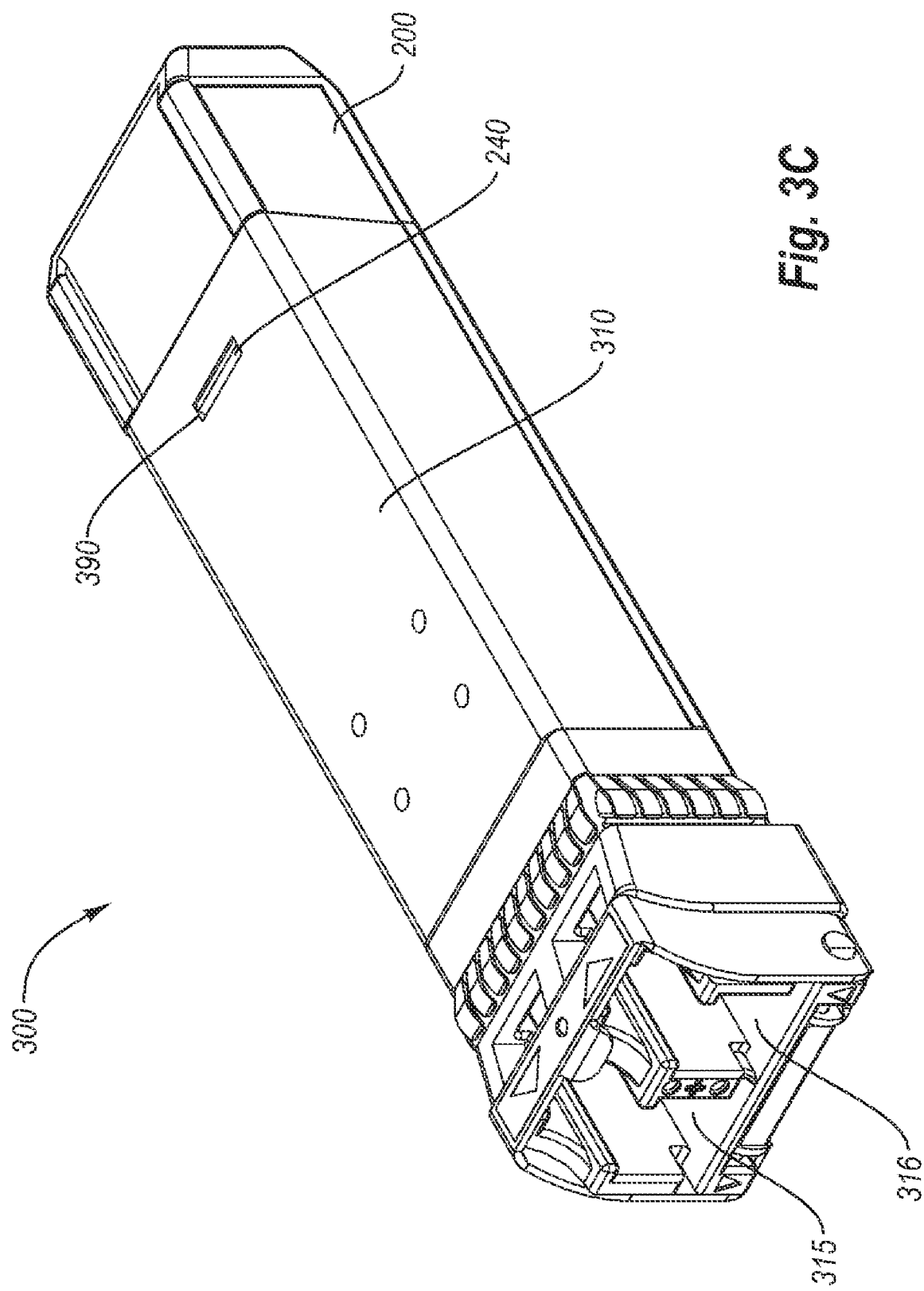

Reference is now made to FIGS. 3A-3C, which illustrate a specific embodiment of an optoelectronic transceiver module 300 that implements PCBA carrier 200. The optoelectronic module 300 is configured to have a form factor that is substantially compliant with the SFP+ (IPF) MSA. Alternatively, optoelectronic transceiver module 300 may be configured to have a variety of different form factors that are substantially compliant with other MSAs including, but not limited to, the X2 MSA, XENPAK MSA, SFF MSA or the SFP MSA.

As illustrated, FIG. 3A shows that optoelectronic transceiver module 300 includes module shell 310. The module shell 310 may be any module typically implemented with optoelectronic transceiver modules. In some embodiments, the module shell may be implemented as a typical clam shell design that has separable top and bottom shell portions. In other embodiments, the module shell 310 may be implemented as a monolithic, one piece shell design that has a top and bottom portion that are not separable.

FIG. 3A also shows that the PCBA carrier 200 may be used with module shell 310. As shown, PCBA carrier 200 includes a base portion 210, a top portion 220, and an end portion 230 as previously described. Note that end portion 230 includes a clip 240 that is configured to help secure PCBA carrier 200 within the module shell 310.

Referring now to FIG. 3B, it is illustrated that PCBA carrier 200 may be placed into a cavity 320 of the module shell 310. Since PCBA carrier 200 holds the optoelectronic transceiver 100, module shell 310 need not include any parts, components, or elements for securing or aligning optoelectronic transceiver 100 within module shell 310. In other words, the module shell 310 is self aligning meaning PCBA carrier 200 mates into cavity 320 without need for additional parts. Of course, it will be appreciated that PCBA carrier 200 may be used with a module shell 310 that does include one or more other parts, components, or elements for securing or aligning optoelectronic transceiver 100 such as screws or fasteners. As also illustrated, end portion 230 is partially open to provide an opening for connector 140 to connect with a host connector when the optoelectronic transceiver module 300 is implemented with a host computer.

FIG. 3C illustrates optoelectronic transceiver module 300 with PCBA carrier 200 implemented inside module shell 310. As can be seen, clip 240 mates with an opening 390 of the module shell 310 to secure PCBA carrier 200 within module shell 310. In addition, end portion 230 of PCBA carrier 200 becomes the end portion of module shell 310 to complete the overall package dimensions. Further, the module shell 310 defines ports 315 and 316 that provide optical ports for the TOSA 120 and the ROSA 130.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A printed circuit board assembly (PCBA) carrier for enclosing an optical transceiver PCBA comprising:
a base portion including one or more first connection members, the base portion being configured to receive an optical transceiver PCBA; and
a top portion including one or more second connection members configured to couple to the first connection members to thereby secure the top portion to the base portion, the top portion being configured to reside above the optical transceiver PCBA when the first and second connection members are coupled;
wherein the PCBA carrier is configured to enclose the optical transceiver PCBA when the base and top portions are coupled to provide a solid structure for the optical transceiver PCBA without the need for a separate optical transceiver module housing, and
wherein the base portion and the top portion cooperate when coupled to define a pair of openings configured to allow a pair of optical sub-assemblies of the optical transceiver PCBA to extend outside the carrier, the pair of openings being configured such that at least a portion of a flange region of each of the pair of optical sub-assemblies is positioned in the corresponding opening when the pair of optical sub-assemblies of the optical transceiver PCBA extend outside the carrier.

2. The PCBA carrier in accordance with claim 1, wherein the first and second connection members extend from the base and top portions.

3. The PCBA carrier in accordance with claim 2, wherein the first connection members include knobs and the second connection members include holes, wherein the knobs are configured to be received by the holes when coupling the base portion and the top portion.

4. The PCBA carrier in accordance with claim 1, further comprising an end portion coupled between the base and top portions, the end portion being configured to surround a portion of the optical transceiver PCBA.

5. The PCBA carrier in accordance with claim 4, wherein the end portion is coupled to the base portion by a first hinge member and is coupled to the top portion by a second hinge member such that the end portion may rotate in relation to the base portion and the top portion may rotate in relation to the end portion.

6. The PCBA carrier in accordance with claim 4, wherein the end portion defines an opening for an electrical interface of the optical transceiver PCBA when the PCBA carrier encloses the optical transceiver PCBA.

7. The PCBA carrier in accordance with claim 1, wherein the base portion includes one or more posts that extend from the main body of the base portion and are configured to align the optical transceiver PCBA when the optical transceiver PCBA is enclosed by the PCBA carrier.

8. The PCBA carrier in accordance with claim 1, wherein the top portion includes one or more extending posts that are configured to extend towards the base portion when the base and top portions are coupled, wherein the one or more extending posts are further configured to bias the optical transceiver PCBA downward when the PCBA carrier encloses the optical transceiver PCBA such that the optical transceiver PCBA is held in position without the need for additional fasteners.

9. The PCBA carrier in accordance with claim 1, wherein the PCBA carrier is configured to allow testing of the optical transceiver PCBA without the use of the separate optical transceiver module housing.

10. The PCBA carrier in accordance with claim 1, wherein the PCBA carrier is comprised of plastic.

11. The PCBA carrier in accordance with claim 1, wherein the top portion defines an opening configured to receive a snap-in heat sink or snap-in EMI absorption material.

12. A printed circuit board assembly (PCBA) carrier for enclosing an optical transceiver PCBA comprising:
a base portion including one or more first connection members, the base portion being configured to receive an optical transceiver PCBA;
a top portion including one or more second connection members configured to couple to the first connection members to thereby secure the top portion to the base portion, the top portion being configured to reside above the optical transceiver PCBA when the first and second connection members are coupled; and
an end portion coupled to the base portion by a first hinge portion and coupled to the top portion by a second hinge portion such that the end portion may rotate in relation to the base portion and the top portion may rotate in relation to the end portion, the end portion being configured to receive a portion of the optical transceiver PCBA;
wherein the PCBA carrier is configured to enclose the optical transceiver PCBA when the base and top portions are coupled to provide a solid structure for the optical transceiver PCBA without the need for a separate optical transceiver module housing.

13. The PCBA carrier in accordance with claim 12, wherein the first and second connection members extend from the base and top portions respectively and define one or more openings for an optical sub-assembly of the optical transceiver PCBA when coupled.

14. The PCBA carrier in accordance with claim 12,
wherein the base portion includes one or more posts that extend from the main body of the base portion and are configured to align the optical transceiver PCBA when the optical transceiver PCBA is enclosed by the PCBA carrier.

15. The PCBA carrier in accordance with claim 12, wherein the top portion includes one or more extending posts that are configured to extend towards the base portion when the base and top portions are coupled, wherein the one or more extending posts are further configured to bias the optical transceiver PCBA downward when the PCBA carrier encloses the optical transceiver PCBA such that the optical transceiver PCBA is held in position without the need for additional fasteners.

16. The PCBA carrier in accordance with claim 12, wherein the end portion defines an opening for an electrical interface of the optical transceiver PCBA when the PCBA carrier encloses the optical transceiver PCBA.

17. An optoelectronic transceiver module comprising:
a module shell defining a cavity; and
a printed circuit board assembly (PCBA) carrier configured to be placed in the cavity of the module shell, the PCBA carrier comprising:
 a base portion including one or more first connection members, the base portion being configured to receive an optical transceiver PCBA;
 a top portion including one or more second connection members configured to couple to the second connection members to thereby secure the top portion to the base portion, the top portion being configured to reside above the optical transceiver PCBA when the first and second connection members are coupled; and
 an end portion coupled to the base portion by a first hinge portion and coupled to the top portion by a second hinge portion such that the end portion may rotate in relation to the base portion and the top portion may rotate in relation to the end portion, the end portion being configured to receive a portion of the optical transceiver PCBA;
wherein the PCBA carrier is configured to enclose the optical transceiver PCBA when the base and top portions are coupled to provide a solid structure for the optical transceiver PCBA without the need for a separate optical transceiver module housing.

18. The optoelectronic transceiver module of claim 17, wherein the end portion includes a clip configured to couple with an opening of the module housing to thereby at least partially secure the PCBA carrier in the cavity of the of the module housing and wherein the end portion acts as an end plug of the module housing, the end portion defining an opening for an electrical interface of the optical transceiver PCBA when the PCBA carrier encloses the optical transceiver PCBA.

19. The optoelectronic transceiver module in accordance with claim 17, wherein the module shell does not include any parts, components, or elements for aligning the PCBA carrier.

20. The optoelectronic transceiver module in accordance with claim 17, wherein the module shell includes one or more parts, components, or elements for aligning the PCBA carrier.

\* \* \* \* \*